E. D. TUCKER.
DRAINAGE PIPE FITTING.
APPLICATION FILED MAY 18, 1905. RENEWED SEPT. 24, 1908.

955,109.

Patented Apr. 12, 1910.

Witnesses
Wm. Koerth.
A. J. Elmore.

Inventor
E. D. Tucker,
By Victor J. Evans.
Attorney

UNITED STATES PATENT OFFICE.

EDWIN DOW TUCKER, OF SANTA BARBARA, CALIFORNIA, ASSIGNOR TO THE H. MUELLER MANUFACTURING COMPANY, OF DECATUR, ILLINOIS, A CORPORATION OF ILLINOIS.

DRAINAGE-PIPE FITTING.

955,109.      Specification of Letters Patent.      Patented Apr. 12, 1910.

Application filed May 18, 1905, Serial No. 261,007. Renewed September 24, 1908. Serial No. 454,538.

*To all whom it may concern:*

Be it known that I, EDWIN DOW TUCKER, a citizen of the United States of America, residing at Santa Barbara, in the county of Santa Barbara and State of California, have invented new and useful Improvements in Drainage-Pipe Fittings, of which the following is a specification.

This invention relates to drainage pipe fittings and has for its objects to produce a simple, inexpensive device of this character designed for connection with a pair of drain pipes, one wherein the waste from one drain will be prevented from passing to the other and one in which a free discharge of water from either of the drain pipes is insured.

A further object of the invention is to provide a simplified form of guard or shield which may be readily introduced into the pipe fitting and one which will move freely under the pressure of water flowing from either waste pipe.

With these and other objects in view, the invention comprises the novel features of construction and combination of parts more fully hereinafter described.

Figure 1:
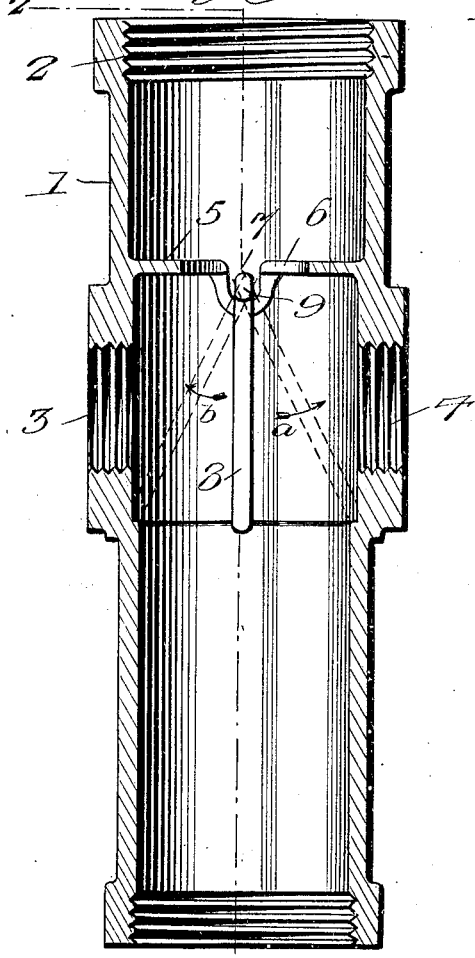
Figure 2:
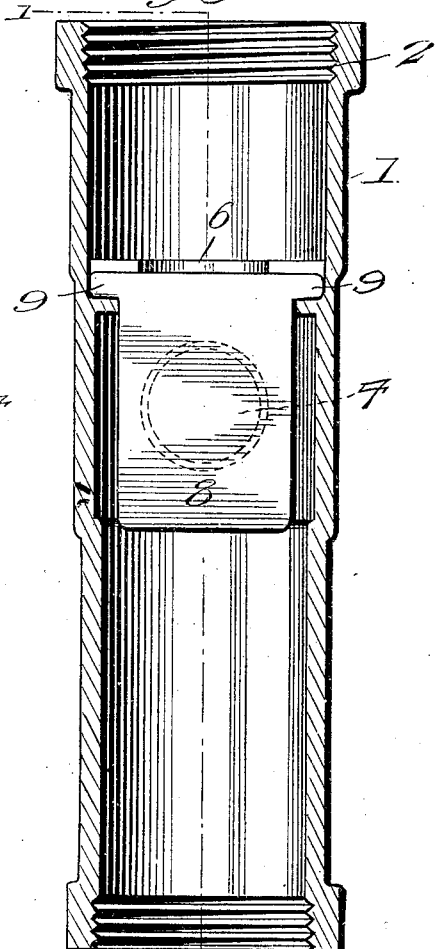
Figure 3:
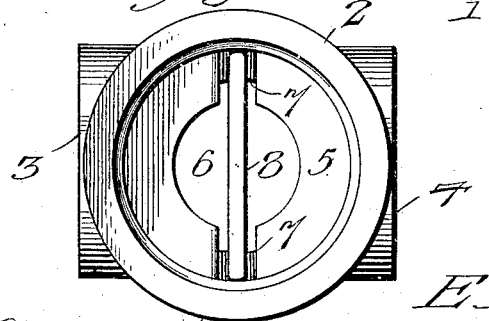

In the accompanying drawings, Figure 1 is a central longitudinal section through a drain pipe fitting embodying the invention, the section being taken on the line 1—1, of Fig. 2. Fig. 2 is a similar view taken on the line 2—2, of Fig. 1. Fig. 3 is a top plan view of the device.

Referring to the drawings, 1 designates a section of a drain or soil pipe, herein termed the pipe fitting, and provided at its normally upper end with internal threads 2 for connection with a vent pipe and with a pair of oppositely disposed lateral inlet openings 3, 4, internally threaded to permit connection of a pair of waste pipes leading respectively, from the traps of separate wash bowls, bath tubs or the like, whereby both waste pipes may discharge through the common fitting 1.

Provided in the pipe section 1, at a point beneath and suitably remote from its upper end is an annular projection or flange 5 having a central bent opening 6 and provided at diametrically opposite points with vertical upwardly opening recesses or depressions 7 constituting bearing seats, said seats being disposed in a plane at right angles to the axes of the openings 3 and 4.

Arranged within the pipe section 1 between the openings 3 and 4 is a movable guard or shield 8 preferably in the form of a metal plate provided at its upper end with oppositely and transversely extending bearing lugs or trunnions 9 designed to seat loosely and have a swinging movement in the seats or depressions 7, whereby the shield 8 will be pivotally suspended between the openings 3 and 4, it being noted that said shield normally hangs perpendicularly of the pipe 1 and centrally between the waste inlet openings.

As will be seen by referring to Fig. 2, the shield 8 has a width substantially equal to the distance between the bearing seats 7, while the trunnions 9 are of an approximate length equal to the axial length of the bearing seats. This construction not only prevents a movement of the shield in a direction corresponding to the axis of its bearings, but in addition provides a structure which eliminates liability of accidental manipulation of the shield so as to withdraw one of the trunnions from the open seat; this is aided by the fact that the radial width of the flange 6 is greater than the similar width of the bearing seat, thereby providing a structure by means of which the introduction of the wire or similar manipulating instrument into the fitting for the purpose of tampering with the shield will be prevented, excepting where the shield is being raised bodily by the use of such instruments placed in contact with the bottom of the shield, the instrument extending through the opening formed within the flange 5. Furthermore, the flange 5, having its upper surface on a plane above the top of the shield when the latter is in position, prevents the insertion of a pipe within the fitting to a depth which would interfere with the free swinging of the shield.

In practice when the waste water from one of the bowls enters the drain pipe 1 through the inlet opening 3 the pressure of the incoming water will swing the shield 8 in the direction indicated by the arrow *a* in Fig. 1 to the dotted line position for closing the opposite opening 4 while on the other hand water entering through the inlet opening 4, will swing the shield in the direction indicated by the arrow *b* in said figure to the dotted line position for closing the opening 3, it being apparent that, under this operation, water entering through one of the inlet openings is prevented from passing outward through the other and further that, owing to the shield being free for movement under the pressure of the incoming water, the latter may flow freely into and through the drain pipe 1. It is to be observed further, that the seats or recesses 7 are of such depth that, should the vent pipe be entered into the drain pipe 1 a sufficient distance, it will contact with the rim or flange 5 without affecting the proper operation of the shield 8.

From the foregoing it is apparent that I produce a simple, efficient device admirably adapted for the attainment of the ends in view, it being understood that minor changes in the details herein set forth may be resorted to without departing from the spirit of the invention.

Having thus described my invention, what I claim is:—

1. In a pipe fitting having opposing inlets, diametrically-opposing bearing seats in the fitting above said inlets, the axis of the bearing seats being at right angles to the axis of the inlet openings, a shield having trunnions swingingly mounted within the bearing seats, said shield having a width substantially equal to the diametrical distance between the bearing seats, said shield being a length to extend below the plane of said inlets, and a member positioned above the plane of said seats and having a radial length greater than the axial length of the seat.

2. In a pipe fitting having opposing inlets, diametrically-opposing bearing seats in the fitting above said inlets, the axis of the bearing seats being at right angles to the axis of the inlet openings, a shield having trunnions swingingly mounted within the bearing seats, said shield having a width substantially equal to the diametrical distance between the bearing seats, said shield being a length to extend below the plane of said inlets, and an inwardly extending flange formed at the top of said seats, said flange having a greater radial length than the axial length of the seats, said seats having a depth greater than the vertical length of the trunnions.

In testimony whereof, I affix my signature in presence of two witnesses.

EDWIN DOW TUCKER.

Witnesses:
  E. A. BOESCKE,
  JOHN R. DUGAN.